United States Patent
Fan et al.

(10) Patent No.: US 11,240,683 B2
(45) Date of Patent: Feb. 1, 2022

(54) PERSONAL ADAPTIVE RADIO ACCESS NETWORK ADVANCED CAPABILITIES

(71) Applicant: AT&T Intellectual Property I, L.P., Atlanta, GA (US)

(72) Inventors: James Fan, San Ramon, CA (US); Dan Celenti, Holmdel, NJ (US); Alireza Hooshiari, Alpharetta, GA (US); Max Faulkner, Jr., Saint Simons Island, GA (US); Arthur Brisebois, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 24 days.

(21) Appl. No.: 16/713,950

(22) Filed: Dec. 13, 2019

(65) Prior Publication Data

US 2021/0185546 A1 Jun. 17, 2021

(51) Int. Cl.
*H04W 16/28* (2009.01)
*H04W 16/26* (2009.01)
*H04W 88/02* (2009.01)

(52) U.S. Cl.
CPC ........... *H04W 16/28* (2013.01); *H04W 16/26* (2013.01); *H04W 88/02* (2013.01)

(58) Field of Classification Search
CPC ..... H04W 16/28; H04W 16/26; H04W 88/02; H04W 88/04; H04W 76/14; H04W 76/20
See application file for complete search history.

(56) References Cited

U.S. PATENT DOCUMENTS

| | | | |
|---|---|---|---|
| 9,742,481 B1* | 8/2017 | Jorgovanovic | H04L 43/16 |
| 2010/0184386 A1* | 7/2010 | Muterspaugh | H01Q 21/245 |
| | | | 455/73 |
| 2013/0336240 A1* | 12/2013 | Cherian | H04L 61/2015 |
| | | | 370/329 |
| 2017/0105147 A1* | 4/2017 | Jiang | H04B 17/318 |
| 2019/0342943 A1* | 11/2019 | Rice | H04W 88/06 |
| 2020/0374979 A1* | 11/2020 | Rice | H04B 17/318 |

* cited by examiner

*Primary Examiner* — Yuwen Pan
*Assistant Examiner* — Fatuma G Sherif
(74) *Attorney, Agent, or Firm* — Amin, Turocy & Watson, LLP

(57) ABSTRACT

Personal adaptive radio access network advanced capabilities are provided. A device can include a transceiver; a processor; and a memory that stores executable instructions that, when executed by the processor, facilitate performance of operations comprising facilitating movement of the device from a first position associated with a user equipment (UE) to a second position in response to an observed signal strength at the UE from a communication network being determined to have fallen below a threshold; in response to facilitating the movement of the device, determining a first communication frequency for communications between the device and the UE based on features determined to be present in an environment associated with the UE; and conveying signals transmitted by the communication network to the UE via the transceiver at the first communication frequency instead of a second communication frequency used by the communication network.

20 Claims, 15 Drawing Sheets

US 11,240,683 B2

PERSONAL ADAPTIVE RADIO ACCESS NETWORK ADVANCED CAPABILITIES

TECHNICAL FIELD

The present disclosure relates to wireless communication systems, and, in particular, to techniques for extending the coverage and functionality of a wireless communication system.

BACKGROUND

With data transfer speeds projected to be at least an order of magnitude higher than the maximum available via current radio access technology, 5G technology is expected to significantly increase demand for transmission of images and videos. Characterized by faster speed, shorter delay, and increased connectivity, this new technology will present service providers with challenges in achieving an acceptable level of service quality. In order to offer this new technology, service providers can be allocated different parts of the high-frequency millimeter radio wave spectrum. Higher frequency waves allow for significant speed increases at the cost of reduced penetration capability. As a result, techniques for overcoming signal blocking by objects, people, or building structures are desirable in order to maintain acceptable quality of service (QOS) and quality of experience (QOE) levels.

DETAILED DESCRIPTION

Figure 1:
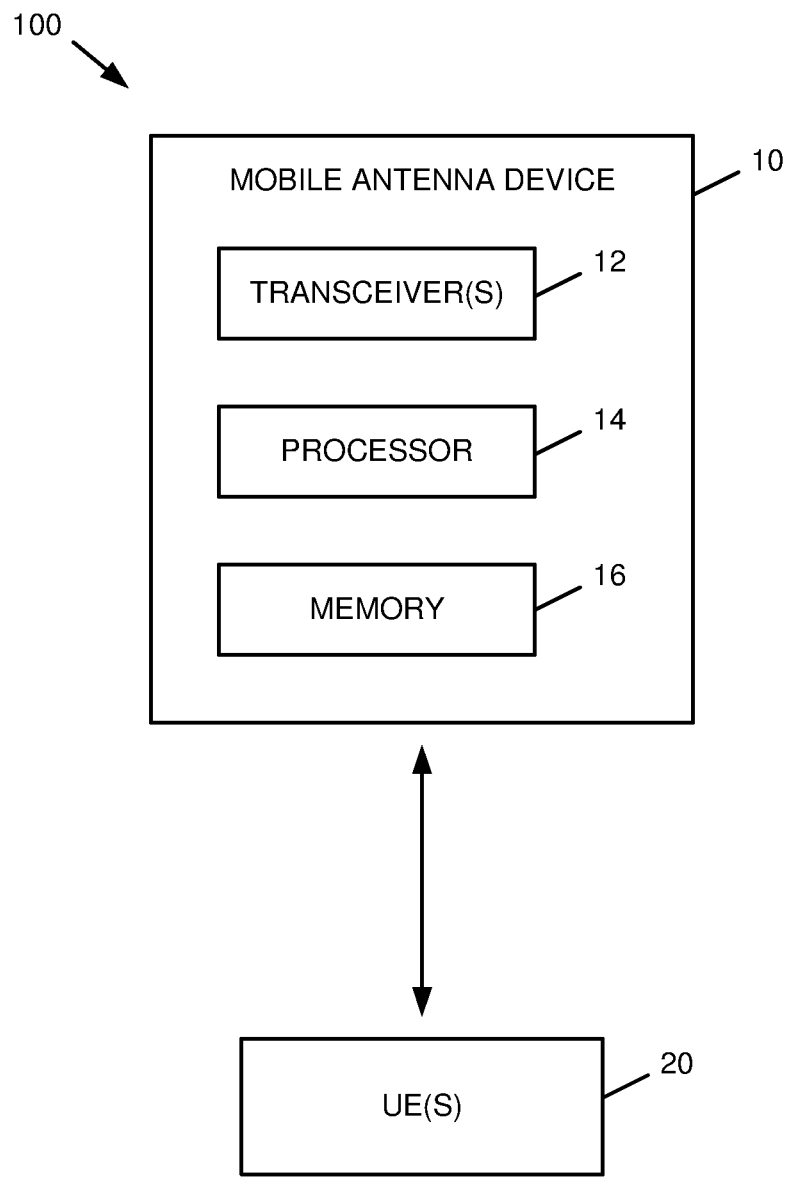
FIG. 1 is a block diagram of a system that facilitates personal adaptive radio access network advanced capabilities in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a device as described herein can include a transceiver, a processor, and a memory that stores executable instructions. The instructions, when executed by the processor, can facilitate performance of operations that include facilitating movement of the device from a first position associated with a user equipment to a second position in response to an observed signal strength at the user equipment from a communication network being determined to have fallen below a threshold; in response to the facilitating the movement of the device, determining a first communication frequency for communications between the device and the user equipment based on features determined to be present in an environment associated with the user equipment, the first communication frequency being different from a second communication frequency used by the communication network; and conveying signals transmitted by the communication network to the user equipment via the transceiver at the first communication frequency instead of the second communication frequency.

In another aspect, a method as described herein can include facilitating, by a mobile antenna device including a processor, movement of the mobile antenna device from a first position associated with a user equipment device to a second position in response to a signal strength observed at the user equipment device from a communication network being lower than a threshold; in response to the facilitating the movement of the mobile antenna device, determining, by the mobile antenna device, a first communication frequency for communication from the mobile antenna device to the user equipment device based on features of an environment associated with the user equipment device, where the first communication frequency is different from a second communication frequency used by the communication network; and relaying, by the mobile antenna device, communications from the communication network to the user equipment device at the first communication frequency instead of the second communication frequency.

In a further aspect, a machine-readable storage medium as described herein can include executable instructions that, when executed by a processor of a mobile antenna device, facilitate performance of operations. The operations can include causing the mobile antenna device to move from a first location associated with a user equipment device to a second location in response to a signal strength observed at the user equipment device from a communication network being lower than a threshold; determining a first frequency for communication from the mobile antenna device to the user equipment device while at the second location based on features of an environment associated with the user equipment device, where the first frequency is different from a second frequency used by the communication network; and relaying signals from the communication network to the user equipment device at the first frequency instead of the second frequency while at the second location.

Referring first to FIG. 1, a system 100 that facilitates personal adaptive radio access network (PARAN) advanced capabilities in accordance with various aspects described herein is illustrated. System 100 as shown by FIG. 1 includes a mobile antenna device 10 that can communicate with one or more user equipment devices (UEs) 20. While the mobile antenna device 10 is illustrated in system 100 as separate from the UE(s) 20, it should be appreciated that some or all of the functionality of the mobile antenna device 10 as described herein could be performed by a UE 20 itself, e.g., a 4G/5G equipped UE, and/or as a standalone device. Examples of devices that can be utilized as a mobile antenna device 10 and their related components and functionality are described in further detail below.

In another aspect, the UEs 20 can include any suitable devices that can communicate over one or more wireless communication networks. Such devices can include, but are not limited to, cellular phones, computing devices such as tablet or laptop computers, autonomous vehicles or other autonomous devices, etc. Also or alternatively, a UE 20 could be a device such as a modem, a mobile hotspot, or the like, that provides network connectivity to another device (e.g., a laptop or desktop computer, etc.) which itself can be fixed or mobile.

The mobile antenna device 10 shown in system 100 can include one or more transceivers 12 that can communicate with (e.g., transmit messages to and/or receive messages from) the UEs 20 and/or other devices in system 100. The transceiver 12 can include respective antennas and/or any other hardware or software components (e.g., an encoder/decoder, modulator/demodulator, etc.) that can be utilized to process signals for transmission and/or reception by the mobile antenna device 10 and/or associated network devices such as an access point or the like.

In an aspect, the mobile antenna device 10 can further include a processor 14 and a memory 16, which can be utilized to facilitate various functions of the mobile antenna device 10. For instance, the memory 16 can include a non-transitory computer readable storage medium that contains computer executable instructions, and the processor 14 can execute instructions stored by the memory 16. For simplicity of explanation, various actions that can be performed via the processor 14 and the memory 16 of the mobile antenna device 10 are shown and described below with respect to various logical blocks or components. In an aspect, the blocks or components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable.

As noted above, 5G technology is projected to provide transfer speeds of at least an order of magnitude higher that the maximum available today, which will in turn increase demand for transmission of images and videos, among other content. Achieving an acceptable level of QOS/QOE will depend on the frequency spectrum service providers have at their disposal to deliver 5G service, as higher frequency waves (e.g., 38 GHz) can allow for significant higher speed at the cost of reduced penetration capability.

Additionally, overcoming signal blocking by objects, people, building structures, etc., can be challenging for service providers who do not own consecutive frequency slots or simply do not have enough suitable spectrums to satisfy the expected traffic growth. This challenge can introduce higher network operating costs, e.g., the additional costs associated with a combination of additional mini towers (e.g., 5G mini base stations) and Wi-Fi gateways deployed in buildings in order to minimize service disruptions due to signal penetration issues. For at least these reasons, it is desirable to implement devices and/or techniques that enhance signal penetration and reduce service disruptions in a manner that is both cost-effective and better adapted to the advanced capabilities of 5G technology.

To the furtherance of the foregoing and/or related ends, the mobile antenna device 10 shown in FIG. 1 can be utilized to offer additional innovate personal adaptive capabilities in both 4G and 5G networks and/or other suitable networks. More particularly, the mobile antenna device 10 can be utilized as a Personal Adaptive RAN (Radio Access Network), or PARAN, device that can support adaptive personal wireless capabilities. The PARAN device can be a standalone device that works with existing UEs 20, or alternatively a PARAN device can be integrated into the UE 20 itself.

In various aspects, the mobile antenna device 10, operating as a PARAN device, can provide enhanced wireless communication capabilities in a variety of areas. For instance, the mobile antenna device 10 can be capable of movement, such as airborne movement similar to that performed by drones or other devices, enabling the mobile antenna device 10 to be self-initiated and/or remotely controlled to adjust position and/or functionality. In another example, the mobile antenna device 10 can support frequency as well as position adaptation to provide optimal signal quality for an associated UE 20. Further, the mobile antenna device 10 can be utilized to support networking between multiple UEs 20, e.g., via UE to PARAN to UE networking. Similarly, the mobile antenna device 10 can support PARAN to PARAN relays with load balancing capabilities to provide self-constructed local networking.

In an aspect, the mobile antenna device 10 can enhance communication signal quality between a UE 20 and a communication network via position and frequency adaptation. For example, in the event that an observed signal strength at a UE 20 from a communication network is determined to have fallen below a threshold, the mobile antenna device 10 can move and/or otherwise facilitate movement between an original (first) position to a new (second) position. A signal quality threshold as used in this manner can be defined in any suitable manner. For instance, a signal quality threshold can be associated with a network-wide minimum QOS. As another example, the signal quality threshold can be set at the UE 20, e.g., by a user associated with the UE 20. Other techniques are also possible. In another aspect, the mobile antenna device 10 can be located on or near an associated UE 20. For example, a mobile antenna device 10 can be physically coupled to a UE 20 and/or another device or structure associated with the UE 20. In response to the observed signal quality falling below the given threshold as described above, the mobile antenna device 10 can move from its original location to a different location, e.g., a location positioned further away from the UE 20 than the original location.

In addition, in response to moving and/or otherwise facilitating movement of the mobile antenna device 10 as described above, the mobile antenna device 10 can further determine a (first) communication frequency for communications between the mobile antenna device 10 and an associated UE 20. As a result, the mobile antenna device 10 can convey signals transmitted by the communication network at the determined (first) frequency instead of a different (second) frequency that is utilized by the communication network. This can be done, e.g., to mitigate the effects of signal interference in an environment by changing a communication frequency utilized by the UE 20 to a frequency that is less prone to interference. Various aspects of the position and frequency adaptation that can be performed by the mobile antenna device 10 are described in further detail below.

Figure 2:
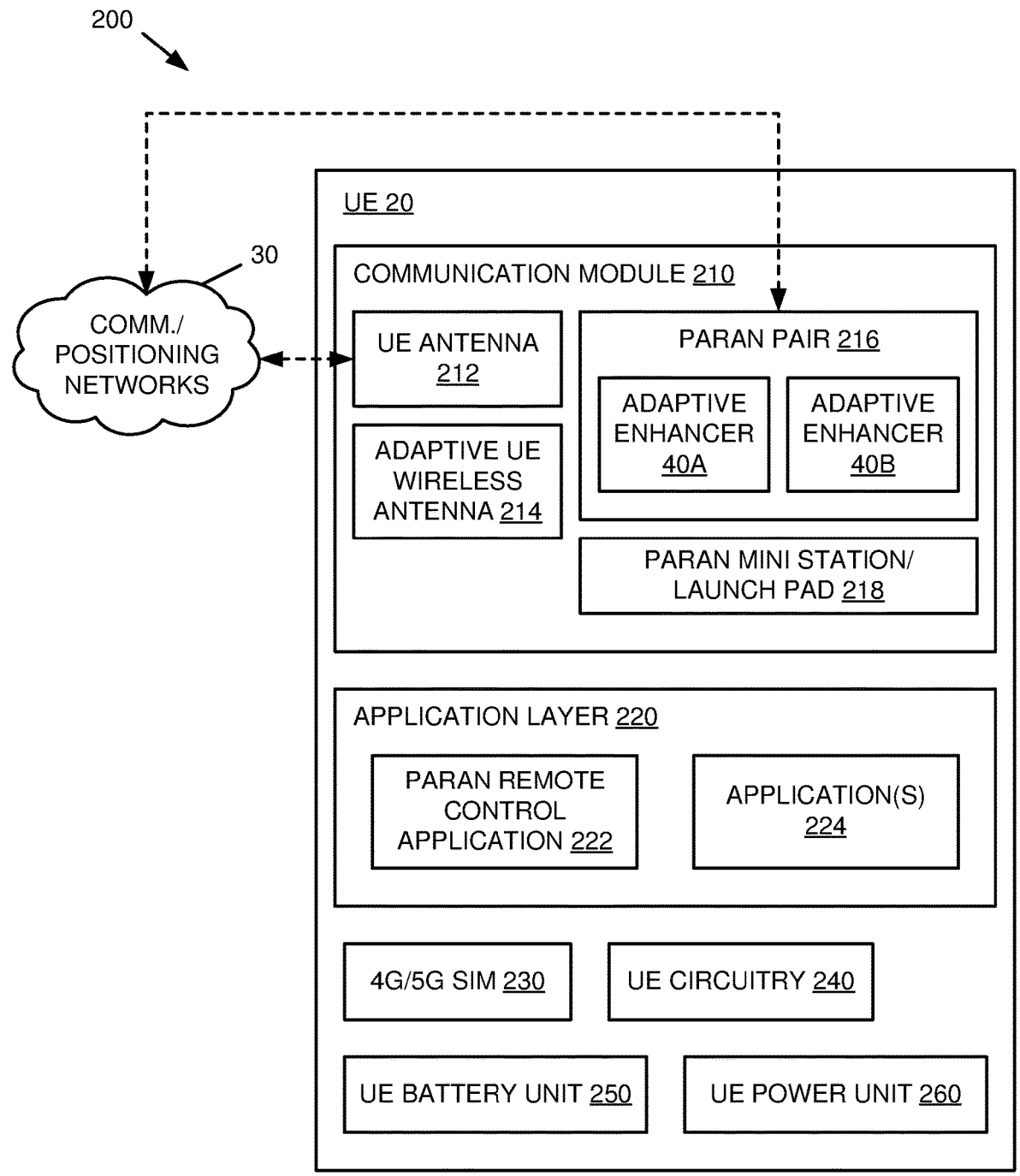
FIG. 2 is a block diagram of an example user equipment device that can be utilized to facilitate a personal adaptive radio access network in accordance with various aspects described herein.

Turning now to FIG. 2, a block diagram 200 of an example UE 20 that can be utilized to facilitate a personal adaptive radio access network in accordance with various aspects described herein is illustrated. For simplicity of illustration, it should be appreciated that some components of the UE 20 are shown in diagram 200 in simplified form. More detailed illustrations and descriptions of these components can be found below, e.g., with respect to FIGS. 3, 4, and 11. Additionally, the UE 20 shown in diagram 200 is associated with a pair of adaptive enhancers 40A-40B, which can function in a similar manner to the mobile antenna device 10 described above with respect to FIG. 1. While the adaptive enhancers 40A-40B shown and described herein can be utilized to implement the mobile antenna device 10, it should be appreciated that the adaptive enhancers 40A-40B shown by diagram 200 are merely one example implementation of the mobile antenna device 10 and that other implementations are also possible.

As shown by diagram 200, an example UE 20 can include a communication module 210, which in turn includes a UE antenna 212 and an adaptive UE wireless antenna 214 that can facilitate communication between the UE 20 and one or more communication and/or positioning networks 30. These networks can include communication networks that operate according to any suitable radio access technology or combination of technologies as well as the global positioning system (GPS) and/or other suitable positioning systems. In an aspect, the adaptive UE wireless antenna 214 can include various transmitters, receivers, and/or other components to enable the UE 20 to receive and transmit signals in various bands. In addition to enhancing received signal quality via frequency band adaptation, the adaptive UE wireless antenna 214 can enable a UE 20 designed for operation on specific frequency bands, e.g., frequency bands associated with a given wireless carrier, to communicate on different frequency bands, thereby enabling the UE 20 to communicate on networks operated by different carriers and/or networks in different geographical areas without additional hardware. In an aspect, the UE antenna 212 and adaptive UE wireless antenna 214 are shown and described in further detail below with respect to FIG. 3.

The communication module 210 shown in diagram 200 can further include a PARAN pair 216, which can include a pair of adaptive enhancers, here adaptive enhancers 40A and 40B, to provide enhanced communication functionality at the UE 20 as described herein. While two adaptive enhancers 40 are shown in diagram 200, it should be appreciated that a UE 20 can be associated with any suitable number of adaptive enhancers 40, including one adaptive enhancer 40 or more than two adaptive enhancers 40. Additionally, it should be appreciated that each of the adaptive enhancers 40 associated with a UE 20 can provide the same functionality or individualized functionality particular to each respective adaptive enhancer 40. In an aspect, each of the adaptive enhancers 40 can include modules that include (a) a frequency extension and adaptation module to support signal extension and interference avoidance, (b) a position adaptation module to support signal coverage optimization, and (c) a local intelligence module to support local closed user group and other intelligent capabilities. These modules, as well as other components of the adaptive enhancers 40, are described in further detail below with respect to FIG. 4.

As additionally shown by diagram 200, the communication module 210 of the UE 20 can include a PARAN adaptive mini station/launch pad (AMSLP) module 218. In an aspect, the AMSLP module can contain circuits and/or other mechanisms that support the adaptive enhancers 40A-40B of the PARAN pair 216. For instance, the AMSLP module 218 can provide charging and/or other operational support for the adaptive enhancers 40A-40B. Also or alternatively, the AMSLP module 218 can function as a launch surface that can physically couple to the adaptive enhancers 40A-40B and decouple from the adaptive enhancers 40A-40B to enable movement of the adaptive enhancers 40A-40B, e.g., via a rotor system associated with the adaptive enhancers 40A-40B as will be described below. While the AMSLP module 218 is depicted in diagram 200 as part of the UE 20 and/or otherwise physically connected to the UE 20, it should be appreciated that the AMSLP module 218 could also or alternatively be physically separate from the UE 20.

As further shown by diagram 200, various applications can be executed at the application layer 220. These applications can include a PARAN remote control application (PRCA) 222, which can act as a mobile application and provide various services relating to the UE 20 and the PARAN pair 216. The PRCA 222 is shown and described in further detail below with respect to FIG. 11. Additionally, various other applications 224 can also be executed in the application layer 220 in addition to the PRCA 222.

In addition to the communication module 210 and the application layer 220 shown in diagram 200, the UE 20 can include additional components to support the operation of the UE 20. For instance, the UE 20 can include a subscriber identity module (SIM) 230 that can store user credentials and/or other information for authorizing and/or conducting communications over a communication network (e.g., a 4G network, a 5G network, etc.). The UE 20 can further include various circuitry 240 that can support respective features of the UE 20, e.g., display or sound output, touchscreen input or other control input, etc. In an aspect, some or all of the UE circuitry 240 can also be used to support operation of the communication module 210 and/or application layer 220 as described above.

As further shown by diagram 200, the UE 20 can include a battery unit 250 that can provide electrical energy to the other components of the UE 20. To supplement the battery unit 250, the UE 20 can further include a power unit 260 that can facilitate charging of the battery unit 250 as well as providing a secondary power source to the components of the UE 20.

Figure 3:
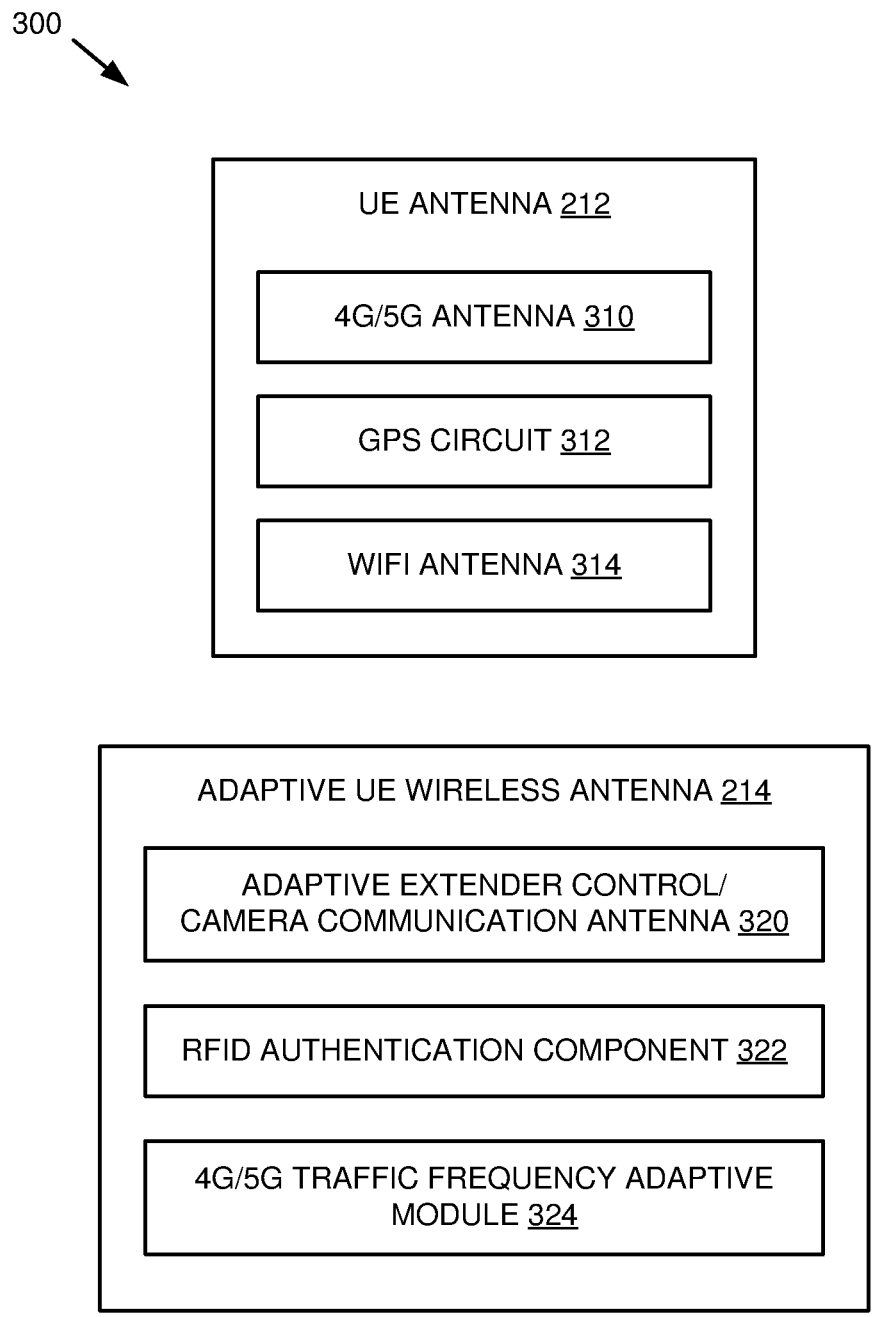
FIG. 3 is a block diagram depicting respective components of the user equipment antenna and adaptive user equipment wireless antenna shown in FIG. 2 in accordance with various aspects described herein.

With reference next to diagram 300 in FIG. 3, the UE antenna 212 and adaptive UE wireless antenna 214 of FIG. 2 are illustrated in further detail. As shown in diagram 300, the UE antenna 212 can include various modules that enable communication by the UE 20 over various network technologies, such as a 4G/5G antenna 310, a GPS circuit 312, and a Wi-Fi antenna 314. Depending on implementation, a UE antenna 212 can include none, some, or all of the modules shown in diagram 300. Also or alternatively, similar modules for other communication technologies could be included within the UE antenna 212.

As further shown in diagram 300, the adaptive UE wireless antenna 214 can include an adaptive extender control and camera communication antenna 320, referred to herein as simply an antenna 320 for brevity. In an aspect, the antenna 320 can be used to establish a remote control channel with a mobile antenna device 10 such as the adaptive enhancers 40 shown in diagram 200. The antenna 320 can utilize a designated frequency band for communications with the adaptive enhancers 40 and/or other devices, e.g., the 900 MHz band, the 2.4 GHz band, etc. Upon establishing a connection to an adaptive enhancer 40, the antenna 320 can enable an associated UE 20 to remotely control the connected adaptive enhancer 40. In an aspect, if the adaptive enhancer 40 is equipped with camera functionality (as will be discussed below with respect to FIG. 4), camera image and/or video data can be delivered to the UE 20 via the antenna 320 at a separate designated frequency band (e.g., the 5.8 GHz band).

The adaptive UE wireless antenna 214 shown in diagram 300 can further include a radio frequency identification (RFID) authentication component 322, which can enable mutual authentication between respective adaptive enhancers 40 and/or other similar devices and an associated UE 20. In an aspect, the RFID authentication component 322 can facilitate authentication of devices via an RFID authentication code and/or by other means.

The adaptive UE wireless antenna 214 can additionally include a 4G/5G traffic frequency adaptive module 324, referred to herein simply as an adaptive module 324 for brevity. In an aspect, the adaptive module 324 can enable communication between adaptive enhancers 40 and/or other similar devices and an associated UE 20 in a given frequency band, e.g., a frequency band lower than 38 GHz. This adapted band can be configured to handle traffic between a communication network, e.g., a 4G or 5G communication network, and the UE antenna 212.

Figure 4:
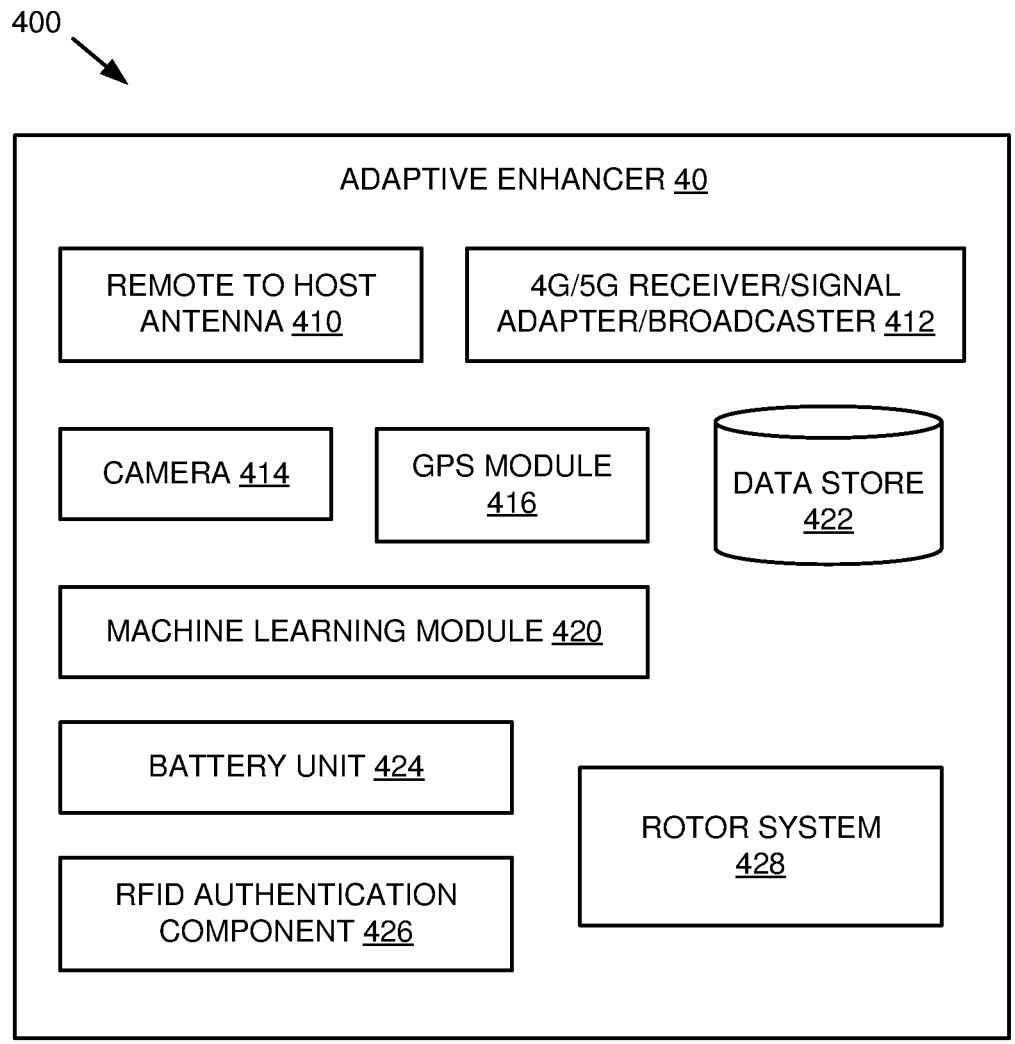
FIG. 4 is a block diagram depicting respective components of an adaptive enhancer device as shown in FIG. 2 in accordance with various aspects described herein.

Turning now to diagram 400 in FIG. 4, an adaptive enhancer 40 of FIG. 2, e.g., one of the adaptive enhancers 40A-40B, are illustrated in further detail. As shown in diagram 400, the adaptive enhancer 40 can include a remote to host antenna (RHA) 410 that can communicate to the UE 20 via one or more frequency bands (e.g., 900 MHz, 2.4 GHz, 5.8 GHz, etc.). The UE 20 can utilize the connection with the RHA 410 to control the adaptive enhancer 40 via a remote control band which can be configured to utilize a frequency between approximately 900 MHz and approximately 2.4 GHz, and/or other suitable frequencies.

The adaptive enhancer 40 shown in diagram 400 further includes a 4G/5G receiver/signal adapter/broadcaster (RSAB) 412, which can provide signal adaptation functionality for the adaptive enhancer 40. For example, the RSAB 412 can receive high-band frequency signals from a 4G/5G network and relay the signals to the UE 20 and/or a different adaptive enhancer 40. The RSAB 412 can relay signals at their originally received frequency, or alternatively the RSAB 412 can convert the signals to a different frequency, e.g., a lower frequency band than that utilized by the 4G/5G network. The RSAB 412 can also perform frequency upconversion and signal relay operations in a similar manner for communications from an associated UE 20 to the 4G/5G network when appropriate. In an aspect, the RSAB 412 can serve as an adaptive frequency module to mitigate frequency penetration and indoor interference issues experienced by an associated UE 20, thereby enabling enhanced signal quality consistency.

The adaptive enhancer 40 shown in diagram 400 can additionally include a camera 414, which can be activated (e.g., by an associated UE 20) and used to transmit images and/or video via a designated frequency band (e.g., the 5.8 GHz band). The adaptive enhancer 40 can also include a GPS module 416 that can enable the adaptive enhancer 40 to obtain positioning data, e.g., in the form of geographic coordinates or the like, and deliver this positioning data to a UE 20 and/or other device. The GPS module 416, along with the RHA 410, the RSAB 412, and/or other components, can also be used by the adaptive enhancer 40 as an adaptive position module that enables the adaptive enhancer 40 to adjust its location in order to optimize service to respective UEs 20 connected to it. This can be done via an autopilot mode, a remotely controlled mode that is managed by one or more UEs 20, and/or by other means.

In an aspect, the camera 414 and GPS module 416 can be utilized by a user of a UE 20 and/or other similar device to obtain information about a location for planning, personal safety, and/or other reasons. For instance, a user that is moving through an area can utilize a UE 20 to dispatch an adaptive enhancer 40 to a location that is further along the user's intended path of travel through the area. The adaptive enhancer 40 can then provide camera images, GPS data, and/or other information associated with the location to which the adaptive enhancer 40 was dispatched back to the UE 20 for viewing by the user.

The adaptive enhancer 40 can further include a machine learning module 420, which can utilize information collected by other components of the adaptive enhancer 40, e.g., the RHA 410, the camera 414, the GPS module 315, etc., to improve performance of the adaptive enhancer 40. To this end, the adaptive enhancer 40 can also maintain a data store 422 that can contain information pertinent to the machine learning module 420 and/or other components of the adaptive enhancer 40.

In addition to the above, the adaptive enhancer 40 shown in diagram 400 can include a battery unit 424 that provides power to the adaptive enhancer 40. The adaptive enhancer 40 can further include an RFID authentication component 426 that can perform local or remote mutual authentication with an associated UE 20, e.g., via an RFID authentication code in a similar manner to the adaptive UE wireless antenna 214 described above.

Additionally, the adaptive enhancer 40 can include a rotor system 428 composed of, e.g., a rotor and blades and/or other suitable components, which can enable airborne movement of the adaptive enhancer 40. In an aspect, the rotor system 428 can operate in combination with the AMSLP module 218 and/or another suitable launch surface to facilitate initial movement of the adaptive enhancer 40. For instance, the adaptive enhancer 40 can be initially physically coupled to the launch surface, and movement of the adaptive enhancer 40 can be initiated by decoupling the launch surface from the adaptive enhancer 40. In response to decoupling the launch surface from the adaptive enhancer 40, the adaptive enhancer can engage and/or otherwise activate the rotor system 428 to enable movement of the adaptive enhancer 40.

In an aspect, a launch surface as described above can simply release the adaptive enhancer 40 to initiate movement, or alternatively the launch surface can eject and/or otherwise initially propel the adaptive enhancer 40. In such a scenario, the adaptive enhancer 40, e.g., via an accelerometer or the like, can detect that it has been ejected from the launch surface and engage the rotor system 428 accordingly. Alternatively, the adaptive enhancer 40 can be configured for manual (user) movement, e.g., via affixing the adaptive enhancer 40 to a wall or other surface as will be described below with respect to FIG. 12. In this scenario, the adaptive enhancer 40 can be configured to refrain from engaging the rotor system 428, even upon ejection from the launch surface, absent further instruction.

In another aspect, the adaptive enhancer 40 can be configured with a range parameter that defines the permissible distance the adaptive enhancer 40 can travel from an associated UE 20. This range can be based on, e.g., capacity of the battery unit 424, present weather or other conditions, capabilities of the rotor system 428 and/or other locomotive modules, etc. Upon reaching the permissible range, e.g., as determined via the RHA 410 and/or the GPS module 416, the adaptive enhancer 40 can be configured to not travel further from the UE 20, and in some cases may be configured to return to the UE 20. The adaptive enhancer 40 can also be configured to return to the UE 20 in the event that its battery level falls below a given threshold, e.g., an amount of stored charge associated with returning to the UE 20 via the rotor system 428. If an adaptive enhancer 40 is recalled in this manner, a second adaptive enhancer 40 associated with the UE 20 can be dispatched to the location of the deployed adaptive enhancer 40 prior to that adaptive enhancer 40 returning in order to facilitate continuity of communication service.

With reference now to FIGS. 5-9, an example procedure that can be utilized by a UE 20 and a pair of adaptive enhancers 40A-40B for enhancing quality of service at the UE 20 from a communication network 32, e.g., a 4G or 5G network, is illustrated via a series of diagrams. It should be appreciated, however, that the acts shown and described with respect to FIGS. 5-9 are provided merely by way of example and that other acts could also be performed without departing from the scope of this description.

Figure 5:
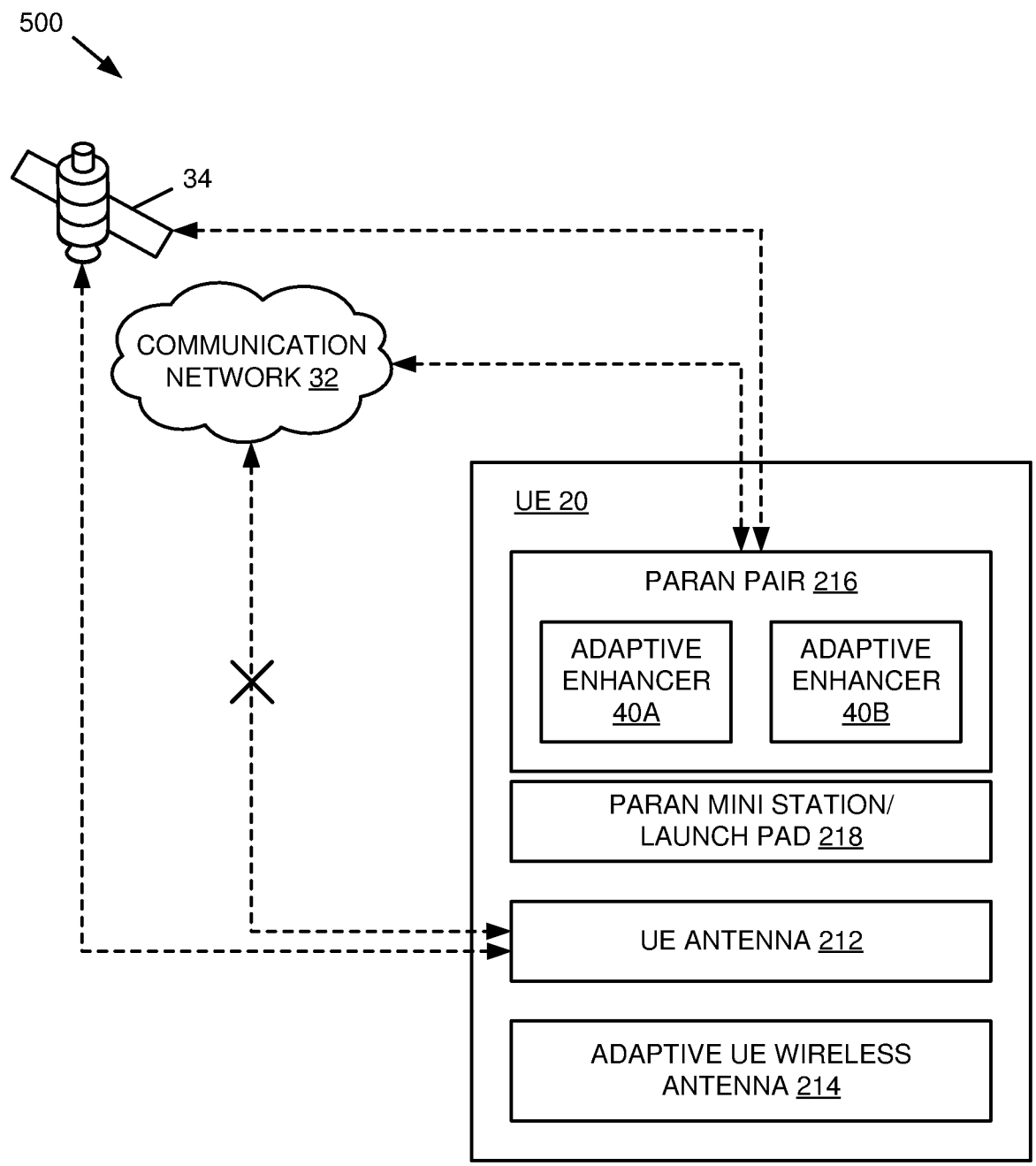
FIGS. 5-9 are diagrams depicting respective example acts that can be performed by the user equipment device and a set of adaptive enhancers in accordance with various aspects described herein.
Figure 6:
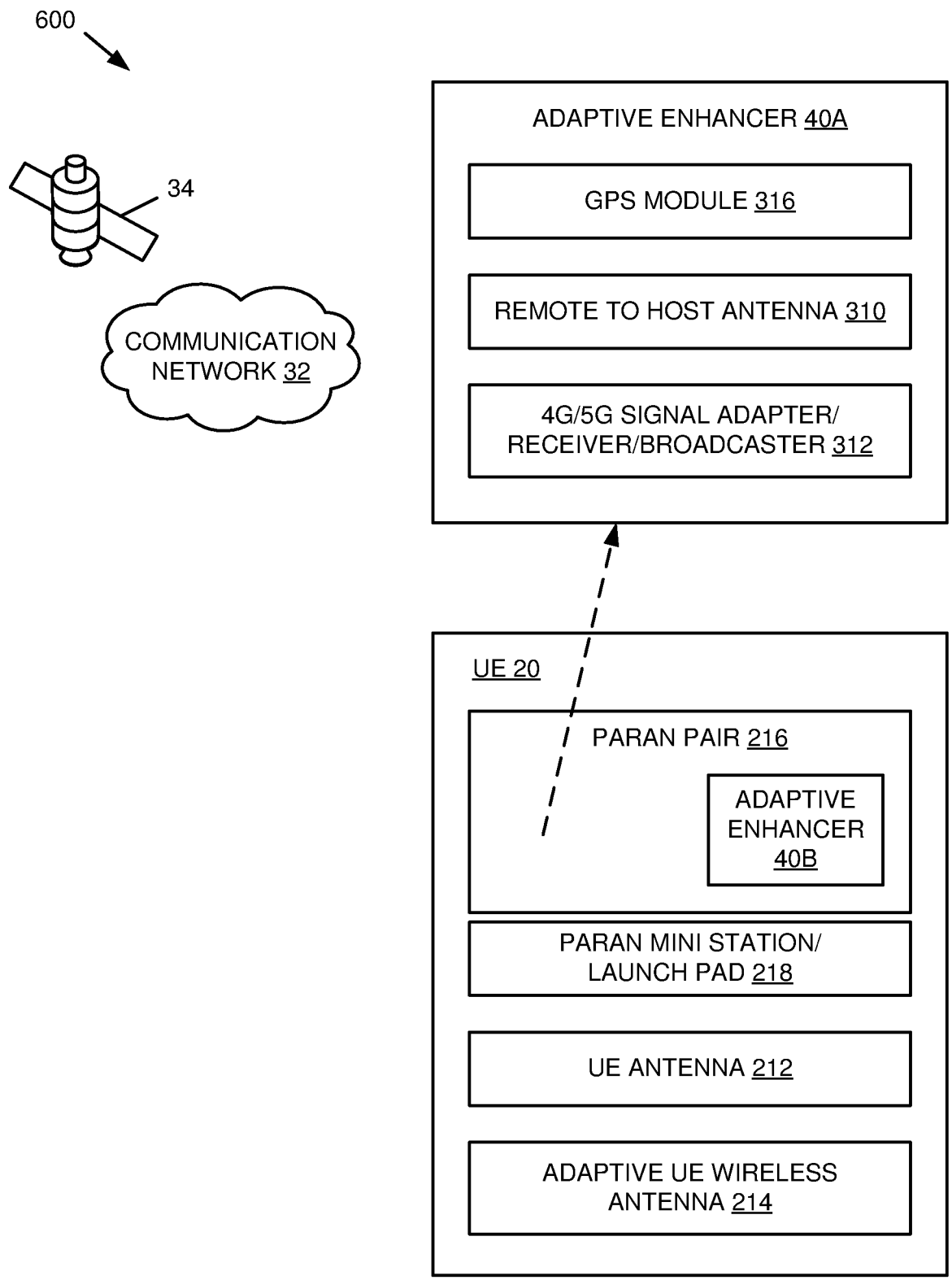

As shown by diagram 500 in FIG. 5, a UE 20 can communicate with a communication network 32 and a positioning system 34 via a UE antenna 212 as described above. In the event that the UE 20 experiences a weakening signal from the communication network 32, the UE 20 and/or an associated user can perform one or more initial actions. For example, the adaptive UE wireless antenna 214 and/or one or both of the adaptive enhancers 40A-40B can be equipped with a retractable antenna/signal enhancer that can be extended for enhanced signal reception. In the event that these initial actions do not sufficiently improve signal quality to the communication network 32, an adaptive enhancer 40A can be dispatched from the UE 20 via one or more techniques as described above, as shown by diagram 600 in FIG. 6.

Figure 7:
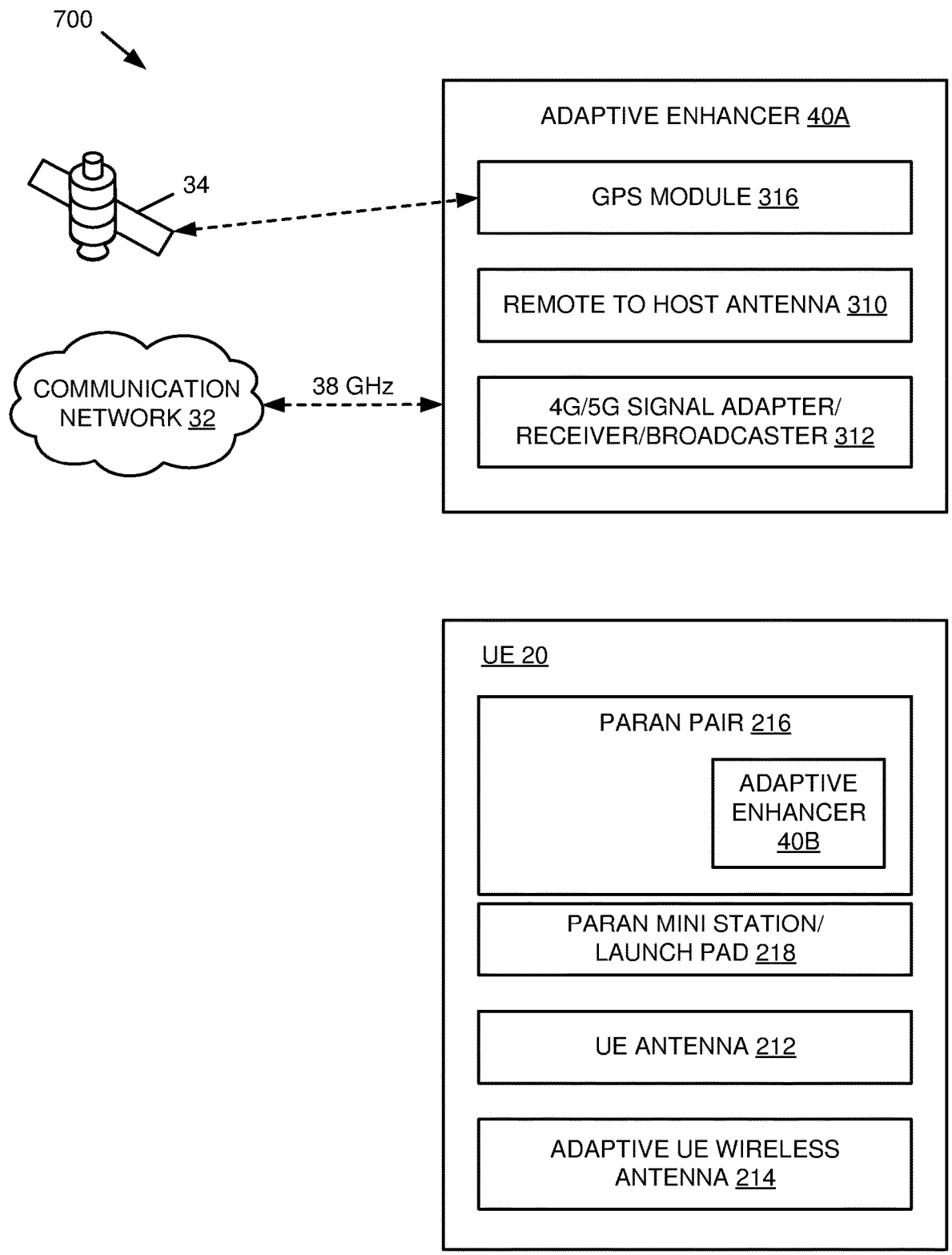

Next, as shown by diagram 700 in FIG. 7, the adaptive enhancer 40A can establish a 4G and/or 5G connection with the communication network 32. Additionally, the adaptive enhancer 40A can (e.g., via the GPS module 416) establish a GPS connection with the positioning system 34. In an aspect, the adaptive enhancer 40A can establish a connection with the communication network 32 at a frequency band associated with the communication network, e.g., a 38 GHz band and/or another suitable band.

In another aspect, before or during establishing connections as shown by diagram 700, the adaptive enhancer 40A can search for a position that provides a best relative signal quality and/or a signal quality that meets a signal quality threshold and, once found, hold the determined position via its rotor system 428 and/or by other means. By way of example, the adaptive enhancer 40A can determine a target position by obtaining signal quality measurements for signals received by the adaptive enhancer 40A from the communication network 32 at respective candidate positions. Based on these measurements, the adaptive enhancer 40A an define one of the candidate positions having a signal quality measurement that is greater than a signal quality threshold as the target position. Other techniques can also be used.

Figure 8:
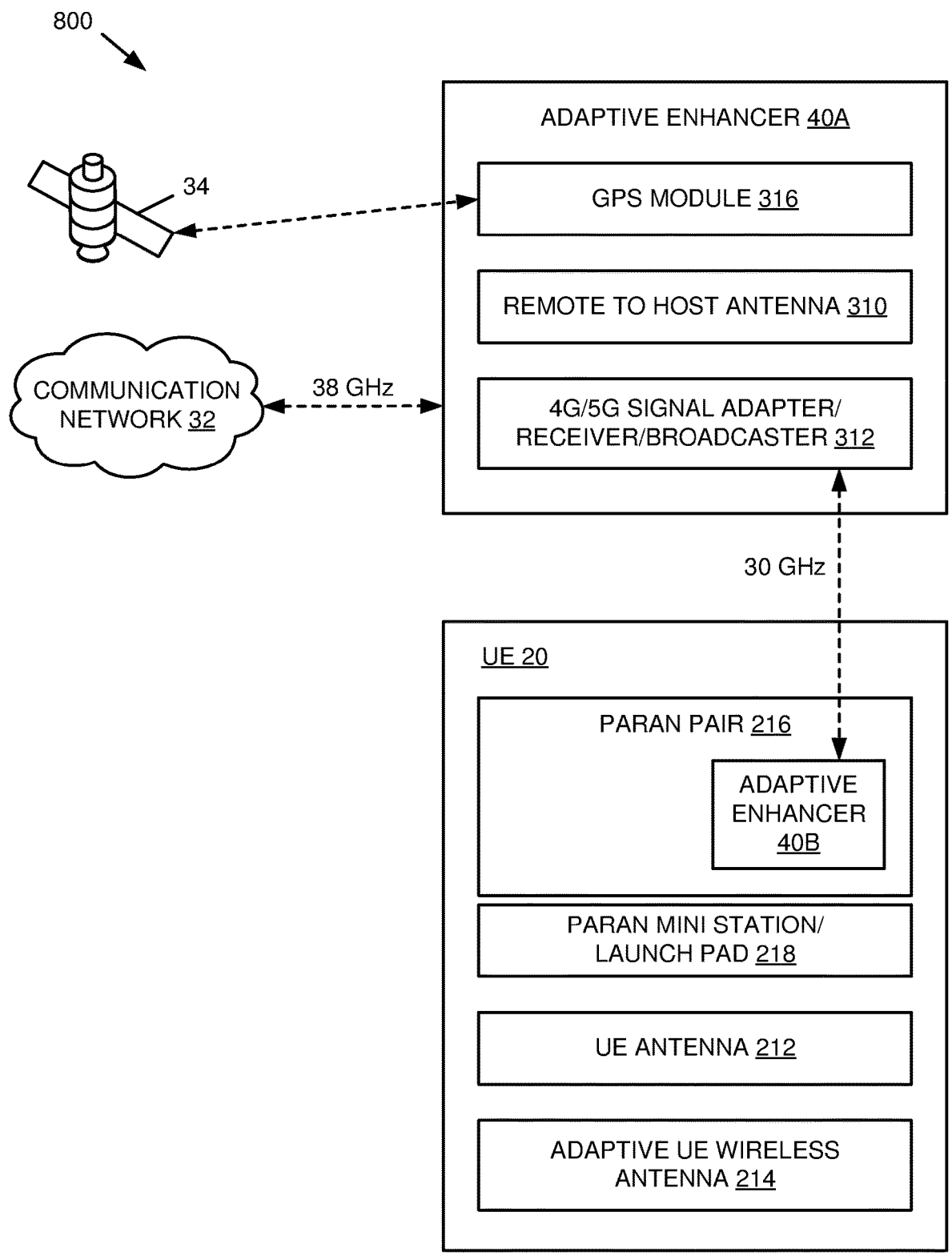

As further shown by diagram 800 in FIG. 8, once the adaptive enhancer 40A has established connections with the communication network 32 and the positioning system 34, the adaptive enhancer 40A can determine whether frequency adaptation is appropriate. For instance, the adaptive enhancer 40A can detect for interference, e.g., as caused by indoor structures and/or other factors. In the example shown by diagram 800, the adaptive enhancer 40A can detect the presence of indoor interference in an area associated with the UE 20. As a result, the RSAB 412 can establish a communication link with the UE 20 at a frequency that mitigates the detected indoor interference, here a lower frequency of 30 GHz as compared to the 38 GHz frequency associated with the communication network 32. As additionally shown in diagram 800, the dispatched adaptive enhancer 40A can establish a connection at the adapted frequency to another adaptive enhancer 40B located at the UE 20.

Figure 9:
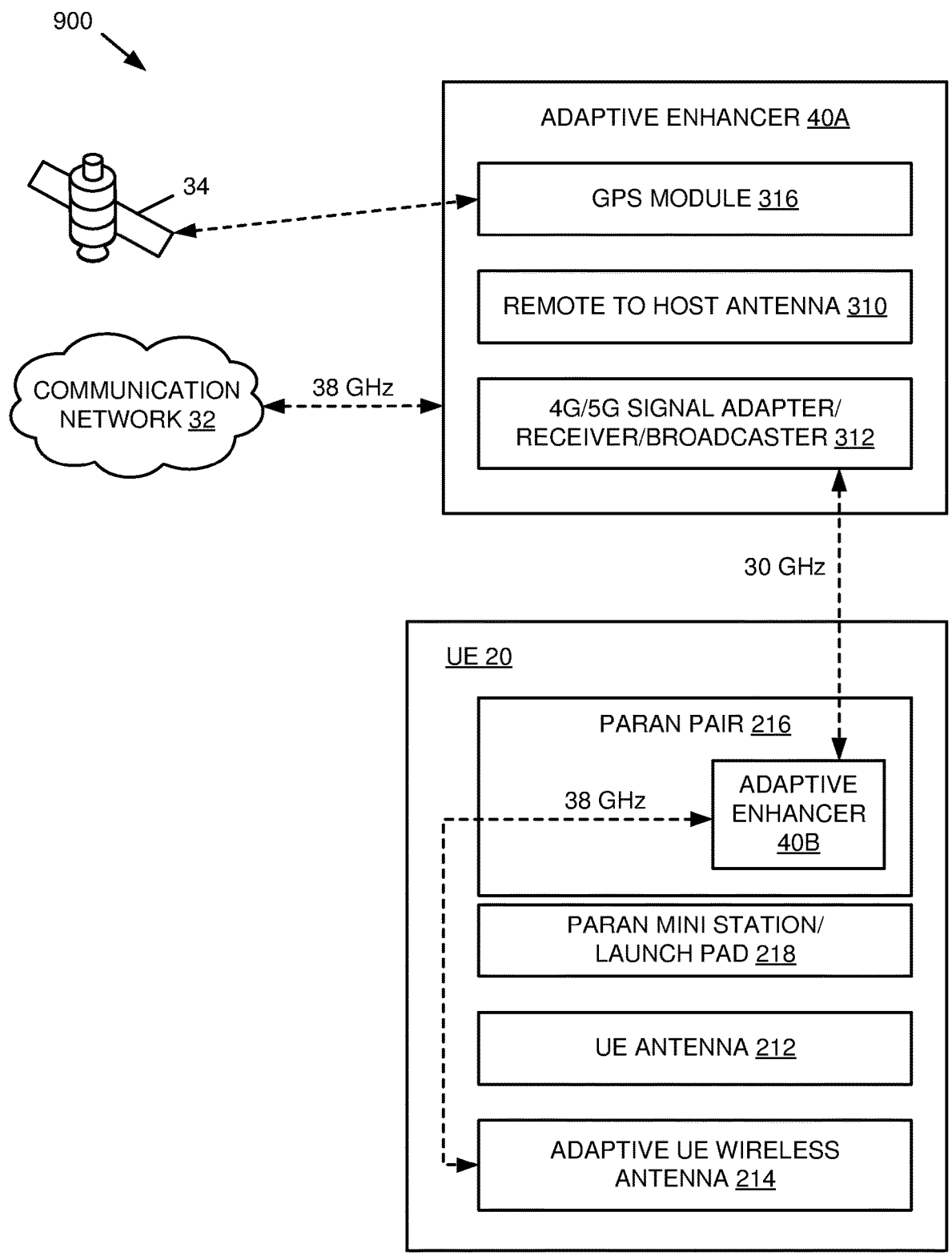

In response to the connection between adaptive enhancer 40A and adaptive enhancer 40B being established, the adaptive enhancer 40B can adapt signals from the adaptive enhancer 40A back to their original frequency band (e.g., the 38 GHz frequency band) and relay those signals to the adaptive UE wireless antenna 214 at the UE 20, as shown by diagram 900 in FIG. 9. Stated another way, the dispatched adaptive enhancer 40A can establish an initial connection with the communication network 32 at a first communication frequency and an additional connection with the non-dispatched adaptive enhancer 40B at a second, different frequency. The dispatched adaptive enhancer 40A can then convey signals received from the communication network 32 at the second frequency associated with the non-dispatched adaptive enhancer 40B instead of the first frequency associated with the communication network 32. The non-dispatched adaptive enhancer 40B can then adapt those signals back to the first communication frequency, enabling the UE 20 to communicate at the communication frequency associated with the communication network 32 without the use of additional adaptation.

In an aspect, the dispatched adaptive enhancer 40A, while away from the UE 20, can perform position adaptation as appropriate to maintain a threshold quality of service between the communication network 32 and the UE 20. Thus, the adaptive enhancer 40A can identify and analyze respective candidate positions as described above in an ongoing manner, e.g., at regular intervals, in response to the quality of service dropping below a threshold, etc.

Figure 10:
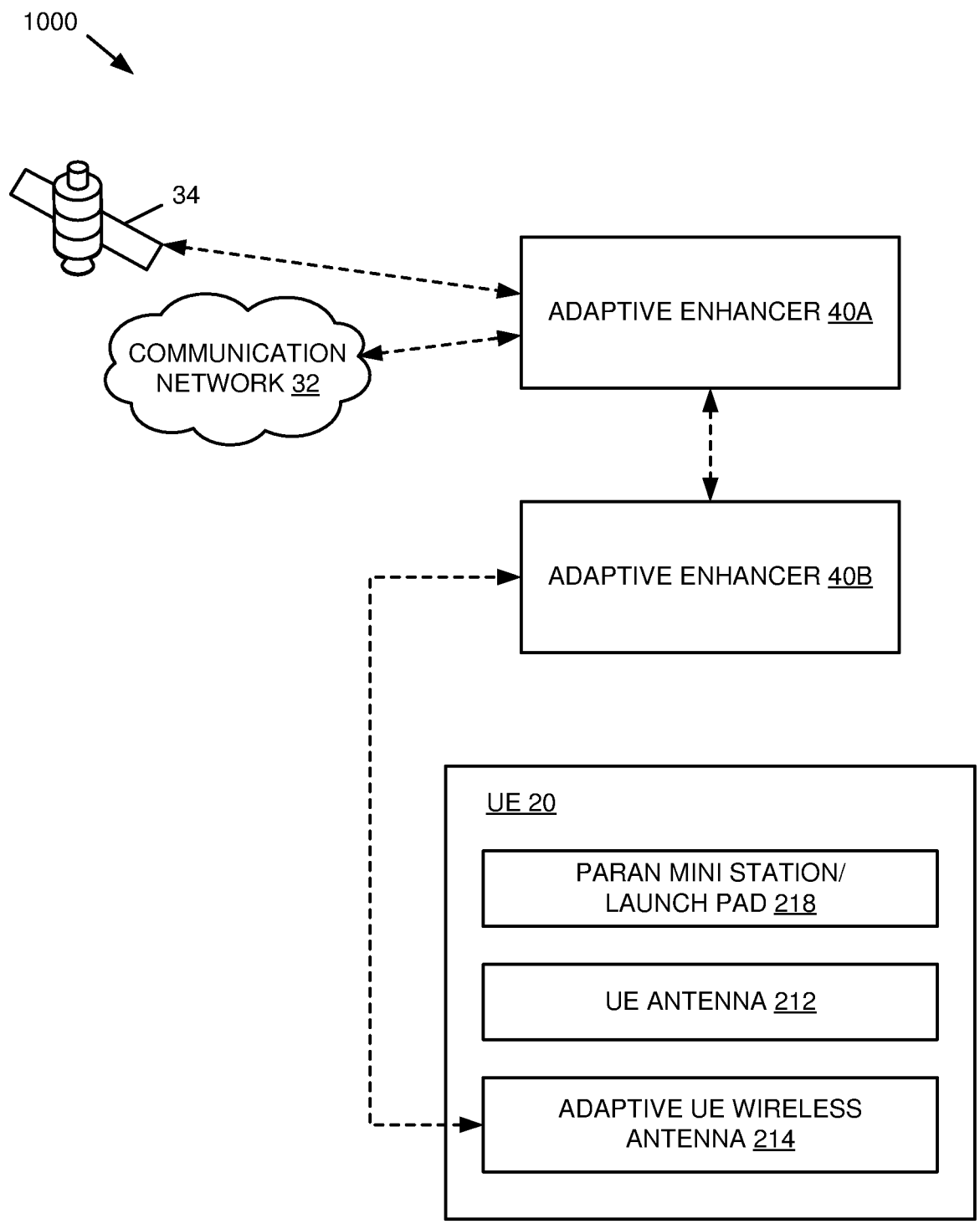
FIG. 10 is a diagram depicting interaction between a user equipment device and a pair of deployed adaptive enhancers in accordance with various aspects described herein.

As described above with respect to FIGS. 5-9, an adaptive enhancer 40A can be launched from the UE 20 to act as an airborne signal adaptive receiver in the event that a signal strength observed at the UE 20 from a communication network 32 falls below a given threshold. In the event that the signal strength remains below the threshold after dispatching the first adaptive enhancer 40A or falls below the threshold subsequent to dispatching the first adaptive enhancer 40A, the second adaptive enhancer 40B can also be launched to relay the signal back to the UE 20, as shown by diagram 1000 in FIG. 10. This can be done, for instance, in cases where a user experiences worsening interference due to moving further into a building and/or other causes. In an aspect, the second adaptive enhancer 40B can adapt and relay signals as shown in diagram 1000 in substantially the same manner as that described above with respect to diagram 900, with the exception that the second adaptive enhancer 40B can establish an additional wireless communication link with the UE 20. If the signal frequency as received from the communication network 32 is modified due to indoor interference and/or other causes, the second adaptive enhancer 40B can provide signals to the UE 20 at either the frequency associated with the communication network 32 or the adapted frequency. In the latter case, the adaptive UE wireless antenna 214 at the UE 20 can adapt the signal back to the original frequency for further processing.

Figure 11:
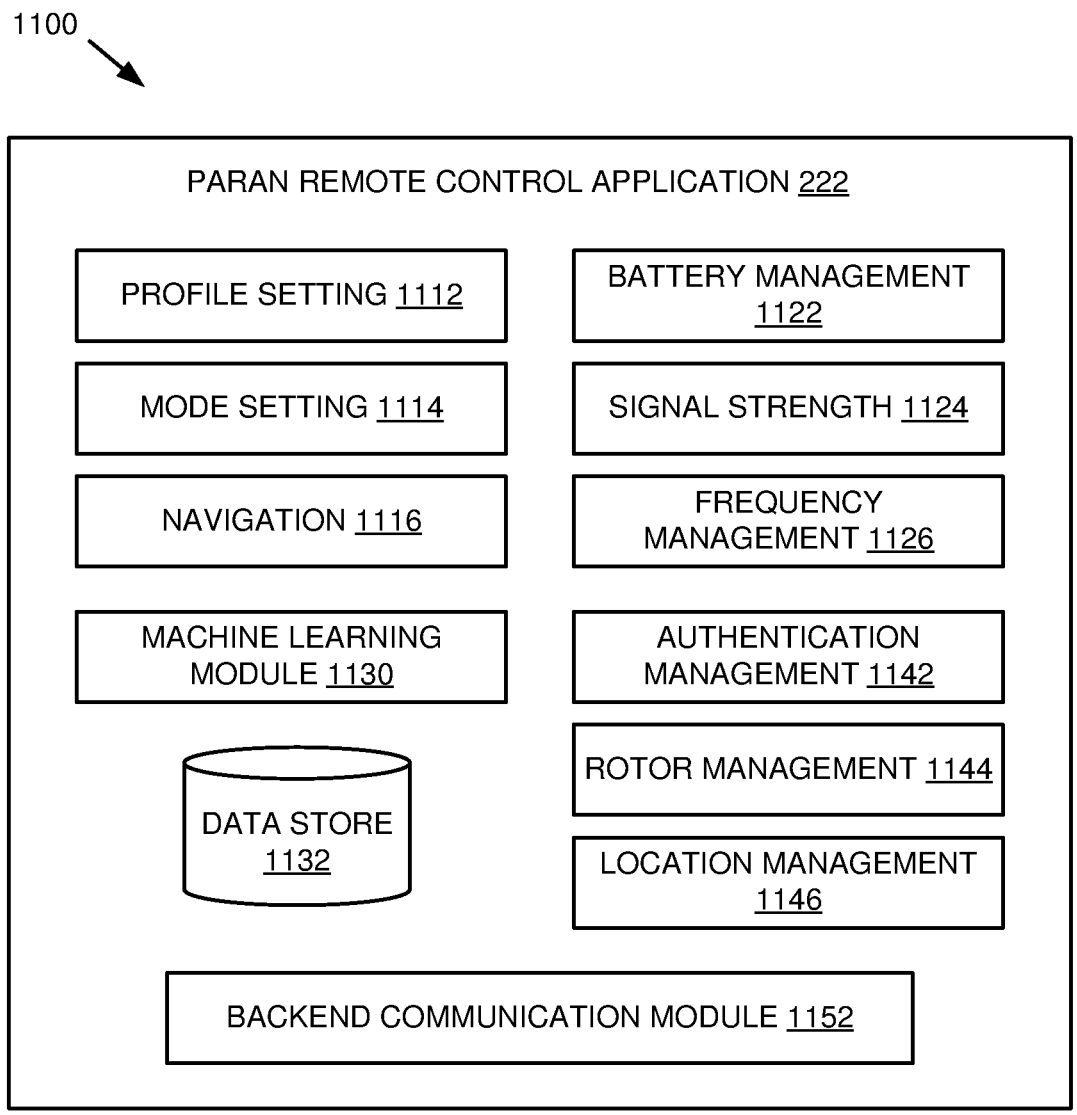
FIG. 11 is a block diagram depicting respective components of the personal adaptive radio access network remote control application shown in FIG. 2 in accordance with various aspects described herein.

Turning now to diagram 1100 in FIG. 11, the PARAN remote control application (PRCA) 222 of FIG. 2 is illustrated in further detail. As shown in diagram 1100, the PRCA 222 can include a profile setting service 1112 that can enable a user to establish a profile and/or preferences for respective adaptive enhancers 40 that are associated with a given UE 20. As further shown in diagram 1100, the PRCA 222 can include a mode setting service 1114 that can set an operating mode of the adaptive enhancers 40. In an aspect, the adaptive enhancers can be set to operate in a manual mode or an autopilot mode. In the manual mode, actions performed by the adaptive enhancers 40 can be initiated by a user manually. In the autopilot mode, the adaptive enhancers 40 can be configured to dispatch automatically upon detecting a weak signal, e.g., as described above with respect to FIGS. 5-9.

The PRCA 222 in diagram 1100 can further include a navigation service 1116 that can enable an associated UE 20 to monitor and control associated adaptive enhancers 40. In an aspect, the navigation service 1116 can further enable remote activation of a camera 414 and/or other modules at an adaptive enhancer 40. The PRCA 222 can further include a battery management service 1122 that can enable the UE 20 to monitor the battery condition of respective adaptive enhancers 40 associated with the UE 20, either locally (for an attached adaptive enhancer 40) or remotely (for a detached adaptive enhancer 40).

As additionally shown in diagram 1100, the PRCA 222 can include a signal strength service 1124 that can enable the UE to monitor signal strength (e.g., both uplink and downlink signal strength) as observed at respective adaptive enhancers 40. The PRCA 222 can further include a frequency management service 1126 that can enable the UE 20, e.g., via a user, to adjust preferred frequency band adaptation rules.

As further shown in diagram 1100, the PRCA 222 can include a machine learning module 1130 and an associated data store 1132 that can collect data pertaining to operation of the UE 20 and/or the adaptive enhancers 40 to improve device performance in a similar manner to the machine learning module 420 and data store 422 of the adaptive enhancer 40 shown in diagram 400.

The PRCA 222 shown in diagram 1100 can also include an authentication management service 1142 that can enable the UE 20 to utilize RFID and/or other authentication mechanisms to perform mutual authentication with its associated adaptive enhancers 40, to introduce a temporary code for single-session authentication (e.g., in connection with a private user network as described below with respect to FIG. 13), and/or for other purposes.

As also shown in diagram 1100, the PRCA 222 can further include a rotor management service 1144 that can control the rotor speed associated with the rotor system 428 of each adaptive enhancer 40, a location management service 1146 that can capture geographic coordinates or other location information associated with respective associated adaptive enhancers 40 and use that information to monitor and/or adjust the distance between the adaptive enhancers 40 and the UE 20, and a backend communication module 1152 that can facilitate communication between adaptive enhancers 40 and/or between adaptive enhancers 40 and the UE 20, e.g., as described above with respect to FIGS. 5-10.

Figure 12:
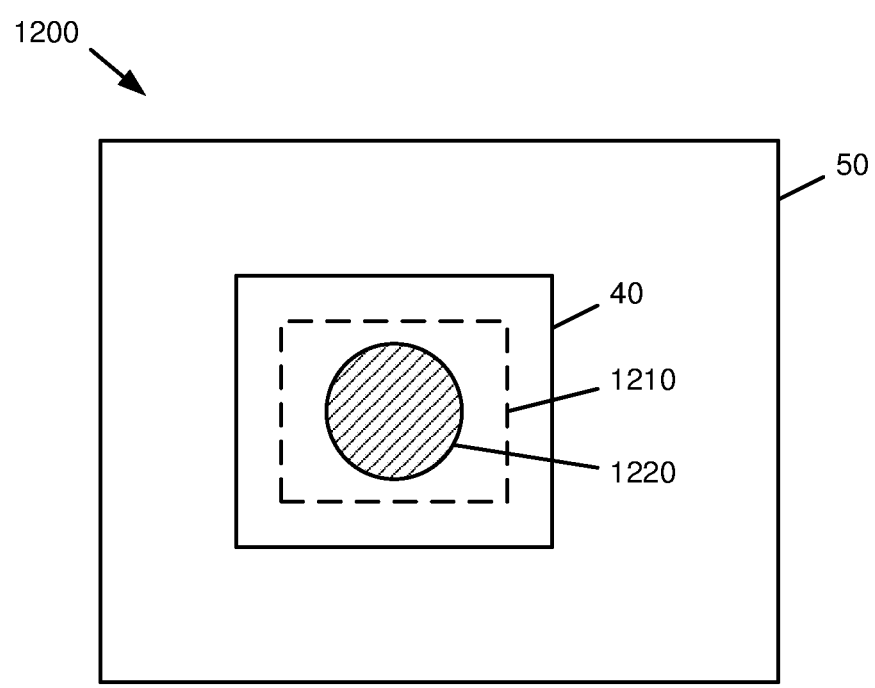
FIG. 12 is a diagram depicting an example surface-mounted adaptive enhancer that can be utilized in accordance with various aspects described herein.

With reference now to FIG. 12, a diagram 1200 depicting an example surface-mounted adaptive enhancer 40 that can be utilized in accordance with various aspects described herein is illustrated. As noted above, an adaptive enhancer 40 can be configured in a manual mode by the PRCA 222 and/or otherwise made manually positionable by a user. In an aspect as illustrated by diagram 1200, an adaptive enhancer 40 configured for manual positioning can be affixed to a surface 50 such as a wall, a window, a desk or table, etc., by a surface adhesive 1210 that is coupled to the adaptive enhancer 40. The surface adhesive can be of any suitable type for adhering the adaptive enhancer 40 to the surface 50. By way of example, the surface adhesive 1210 can facilitate attachment of the adaptive enhancer 40 to the surface 50 via suction, static adhesion (cling), magnetism, and/or any other suitable techniques. In an aspect, the surface adhesive 1210 can be constructed using materials and/or techniques that enable removal of the adaptive enhancer 40 from the surface 50 without causing damage to the surface 50, the adaptive enhancer 40, or the surface adhesive 1210.

As further shown in diagram 1200, the adaptive enhancer 40 can include an activation switch 1220 that enables manual activation and deactivation of the adaptive enhancer 40. For instance, the adaptive enhancer, once affixed to the surface 50, can be configured to initialize communication services, such as conveying signals transmitted from a communication network 32 to an associated UE 20, in response to the activation switch 1220 being engaged. In an aspect, the activation switch 1220 can be and/or include any suitable input mechanism, such as a pushbutton, a toggle switch, a touchpad, etc.

With further reference to the above description, an example use case that can be performed by a UE 20 equipped with a pair of adaptive enhancers 40 is described below. It should be appreciated that the operations outlined below represent merely an example use case, and that other applications and/or operations could also be performed.

In an aspect, the example use case can begin when a user carries a UE 20 (e.g., in a briefcase or other container) toward a building such as an office building. Once inside the building, the user can check the signal strength of the UE 20. If the user detects that a 4G/5G signal at the UE 20 is weak or absent, the user can first extend an antenna at an adaptive enhancer 40 associated with the UE 20, e.g., a RHA 410 at the adaptive enhancer 40, to extend the antenna reach of the UE 20. For clarity, this adaptive enhancer 40 is referred to in the following description as AE1. If extending the antenna of AE1 does not result in a sufficient increase to signal strength, the user can eject AE1 and attach it to a window of the building, e.g., as shown by diagram 1200.

Once attached to a window or other surface and activated, AE1 can initiate an RFID mutual authentication process with the UE 20, e.g., via RFID authentication components 322, 426, at the adaptive UE wireless antenna 214 of the UE 20 and AE1, respectively. In response to successful authentication, the UE 20 can communicate with AE1 for remote control of AE1. Additionally, the UE 20 can instruct AE1 to transmit video content, e.g., as captured by a camera 414 at AE1, to the UE 20.

Further in response to successful authentication between the UE 20 and AE1, AE1 can establish communication with a communication network at a given frequency band (e.g., a 5G network at a 38 GHz band). AE1 can then determine whether indoor interference is present in the area of the building in which it is located and perform frequency adaptation to mitigate any detected interference. For instance, as shown in diagram 800 above, AE1 can adapt a 38 GHz signal received from a communication network to a lower frequency (e.g., 30 GHz, 24 GHz, etc.).

As the user remains in the building, the user can utilize the PRCA 222 to set a second adaptive enhancer 40, referred to herein as AE2, to an autopilot mode. Accordingly, if the user moves further into the building and the signal strength at the UE 20 again weakens, the weak signal strength can cause AE2 to eject from the UE 20 automatically, e.g., as shown by diagram 1000 above. Upon AE2 being ejected, AE2 can establish communication with AE1 at the adapted frequency associated with AE1. AE2 can then authenticate with the UE 20 in a similar manner as the authentication between the UE 20 and AE1 to enable communication between AE2 and the UE 20. In the event that AE2 detects further indoor interference, AE2 can again adapt communication signals between AE2 and the UE 20 to a lower frequency band (e.g., 12 GHz, etc.). In the event that the signal frequency utilized by AE2 does not match that of the communication network, the adaptive UE wireless antenna 214 and/or other components of the UE 20 can convert signals back to their original frequency for further processing.

Figure 13:
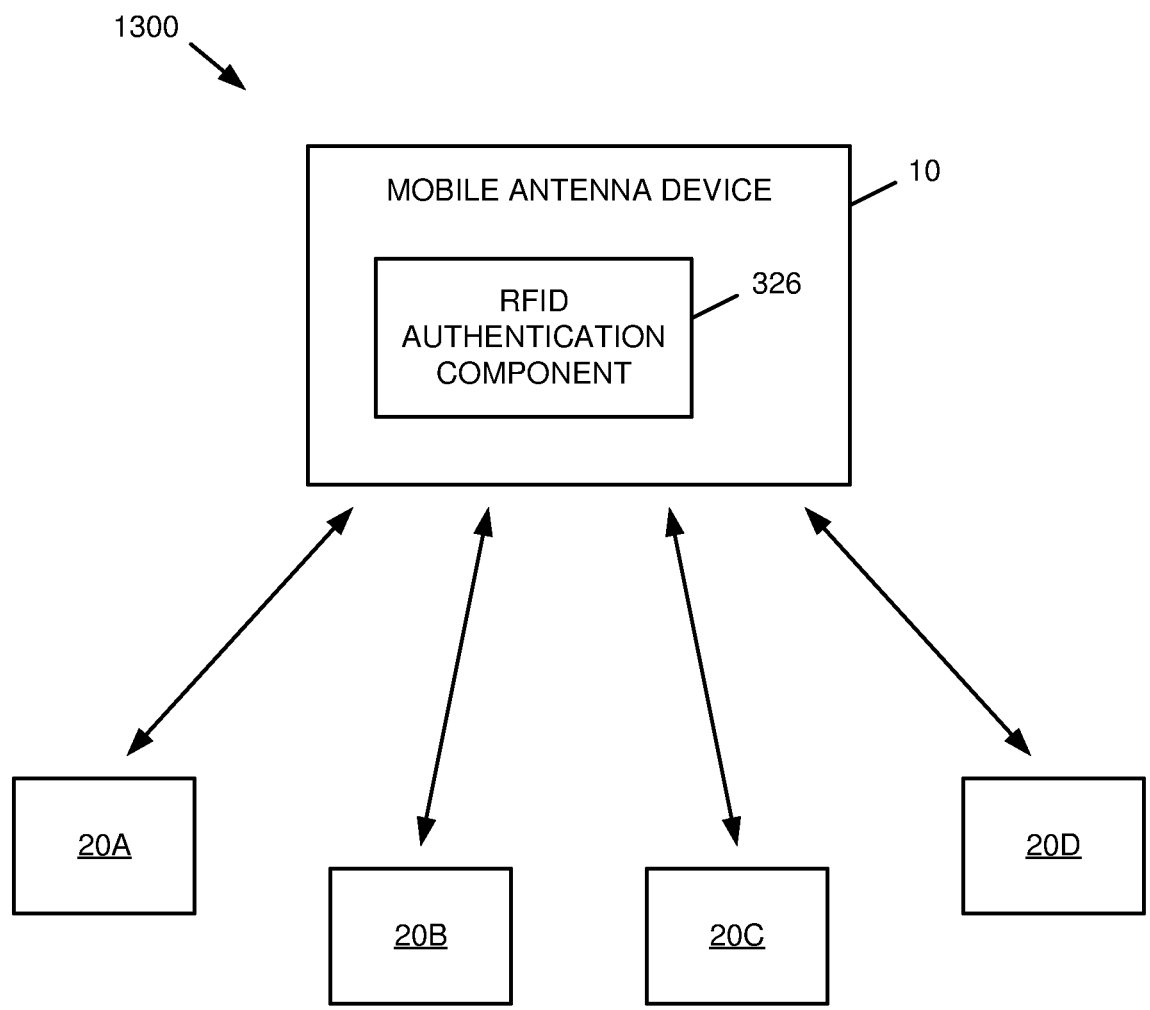
FIG. 13 is a block diagram of a system that facilitates management of a closed user group via a mobile antenna device in accordance with various aspects described herein.

Referring now to FIG. 13, a block diagram of a system 1300 that facilitates management of a closed user group via a mobile antenna device 10 (e.g., an adaptive enhancer 40) in accordance with various aspects described herein is illustrated. As shown in FIG. 13, a mobile antenna device 10 as described herein can be utilized to establish and support a closed user community or group. A user community established in this manner can enable authorized UEs, e.g., UEs 20A-20D as shown in FIG. 13, to communicate with each other locally with or without a connection to a communication network operated by a service provider. In an aspect, the mobile antenna device 10 can be utilized in this manner as a local hub to enable a closed user group when other communication services, such as 4G/5G service, are not available.

In an aspect, the mobile antenna device 10 can utilize an RFID authentication component 426 as described above with respect to FIG. 4 to authorize respective UEs 20 for communication in the closed group. By way of example, the RFID authentication component 426 at the mobile antenna device 10 can receive authentication data from respective UEs 20, e.g., via a transceiver 12. In response to successfully validating the authentication data, the mobile antenna device 10 can enable communication between respective UEs 20 via the mobile antenna device 10 independently of an underlying communication network.

In another aspect, a closed user group as facilitated by a mobile antenna device 10 can be managed by a UE 20 associated with the mobile antenna device 10, e.g., via a user of that UE 20. For instance, a user of the UE 20 associated with the mobile antenna device 10 can be made an owner of the user group and can manually accept or deny requests to join the group. Also or alternatively, the mobile antenna device 10 and/or its associated UE 20 can maintain a list of trusted devices that can join the user group without manual confirmation.

Once a device such as a UE 20 has entered a closed user group associated with a mobile antenna device 10, the device can utilize services provided by the mobile antenna device 10, such as push to talk, notifications, messaging, or the like, with other UEs 20 connected to the mobile antenna device 10 as if those devices were connected to a communication network associated with a service provider. In an aspect, respective UEs 20 connected in a user group through a mobile antenna device 10 can refer to each other based on their device identifiers or other unique properties of each UE 20 in the group. Also or alternatively, UEs 20 can reference each other via other identifying information, such as an identification number or the like, that is assigned to the respective UEs 20 by the mobile antenna device 10.

In an aspect, a closed user group as provided by a mobile antenna device 10 can be utilized by respective device users in the event of an emergency or other event in which an underlying communication service is unavailable. By way of non-limiting example, a scenario of a closed user group that can be employed by first responders to an emergency site is described below. It should be appreciated that the following description is merely an example use case and that other operations and/or uses are also possible.

When an emergency event (e.g., a fire, police activity, a medical emergency, etc.) occurs at a building or other site, first responders arriving on the scene can first determine whether adequate cellular service is available at the emergency site. In the event that no service or poor service is present, a responder can release an adaptive enhancer 40 from an associated UE 20, e.g., and attach the adaptive enhancer 40 to a wall or other surface via a surface adhesive 1210. Once the adaptive enhancer has been activated (e.g., either automatically or via an activation switch 1220), the responder can utilize a PRCA 222 and/or other means to enable closed group networking capabilities.

In response to activation of the adaptive enhancer 40 as described above, the adaptive enhancer 40 can automatically establish a location specific group, such as a mission-critical push to talk (MCPTT) group, that includes respective UEs 20 associated with the adaptive enhancer 40. As a result, UEs 20 associated with other responders in the area can join the closed user group to communicate with each other. In the event that a responder is located too far from the adaptive enhancer 40 and/or interference is present in the area of the responder, the affected responder can eject an additional adaptive enhancer 40 to relay the signal from the original adaptive enhancer 40 in order to join the closed user group. By establishing a MCPTT group and/or other user groups in this manner, first responders and/or other users can establish communication in an area with weak communication service or no communication service independently of a service provider, thereby enabling responders to enter an emergency site without delays associated with setting up a temporary network in the area.

As respective UEs 20 in the user group communicate with each other in an emergency situation, environmental data, UE location data, and/or other information can be provided to appropriate law enforcement agencies, service providers as appropriate to facilitate a coordinated emergency response. Also or alternatively, respective users in the group can be notified if non-authorized users (e.g., civilians at the emergency site, etc.) attempt to attach to a deployed adaptive enhancer 40. This notification can be accompanied by information, such as location information or the like, associated with the non-authorized user, which can be utilized to improve search and rescue, law enforcement, and/or operations in the area.

Figure 14:
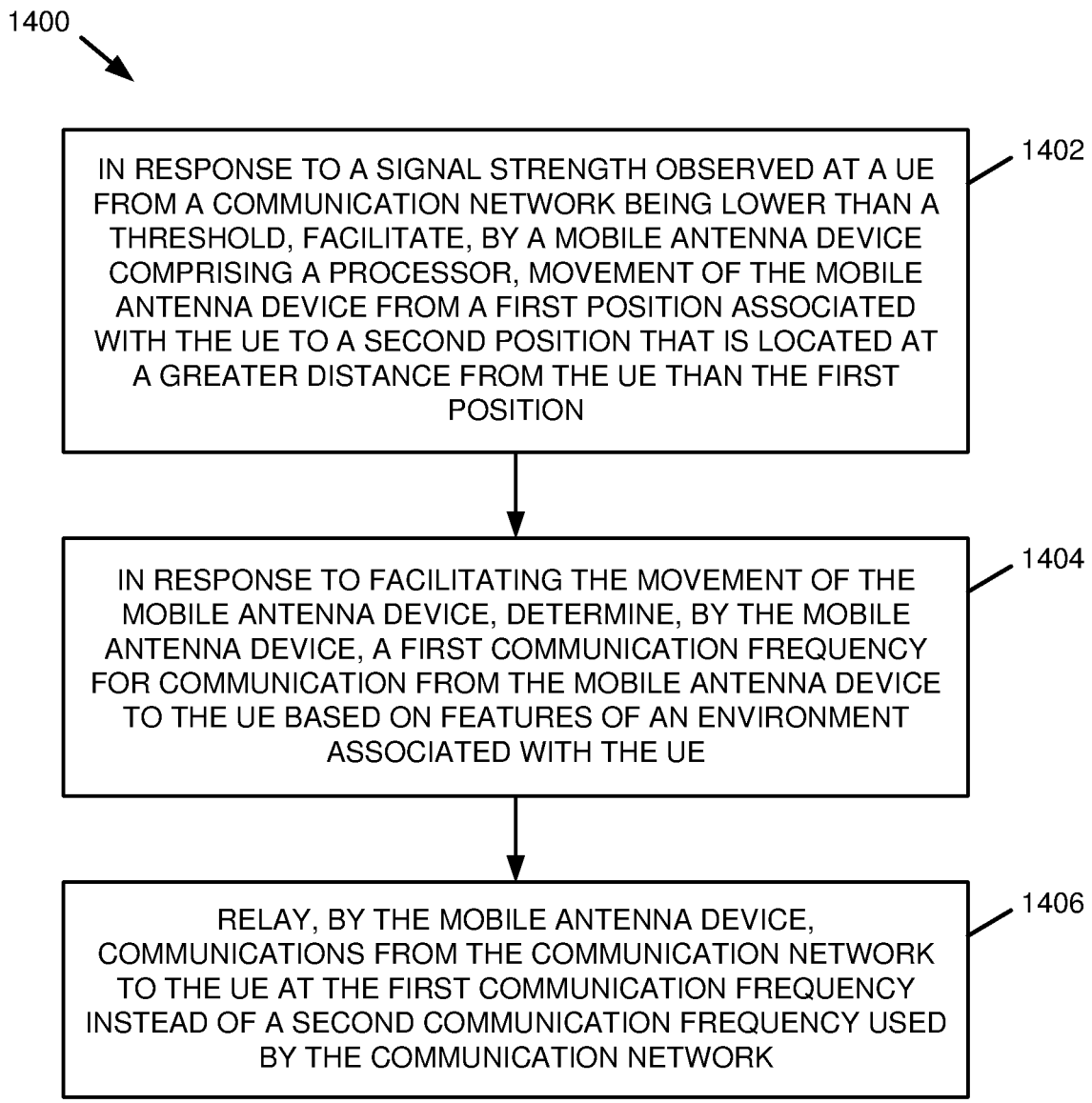
FIG. 14 is a flow diagram of a method that facilitates personal adaptive radio access network advanced capabilities in accordance with various aspects described herein.

With reference next to FIG. 14, a flow diagram of a method 1400 that facilitates personal adaptive radio access network advanced capabilities is presented. At 1402, a mobile antenna device comprising a processor (e.g., an adaptive enhancer 40 and/or other mobile antenna device 10 comprising a processor 14) can facilitate movement of the mobile antenna device from a first position associated with a UE (e.g., a UE 20) to a second position in response to a signal strength (e.g., a 4G/5G signal strength) observed at the UE from a communication network (e.g., a communication network 32) being lower than a threshold. In an aspect, the second position can be located at a greater distance from the UE than the first position. In another aspect, movement of the mobile antenna device at 1404 can be automatic, e.g., via a rotor system 428, and/or manual, e.g., via attachment of the mobile antenna device to a surface via a surface adhesive 1210 or other means.

At 1404, in response to facilitating the movement of the mobile antenna device at 1402, the mobile antenna device can determine (e.g., via an RSAB 412) a first communication frequency for communication from the mobile antenna device to the UE based on features of an environment associated with the UE, such as interference present in the area near the UE.

At 1406, the mobile antenna device can relay (e.g., via the RSAB 412) communications from the communication network to the UE at the first communication frequency as determined at 1404, e.g., instead of a second communication frequency used by the communication network 32.

Figure 15:
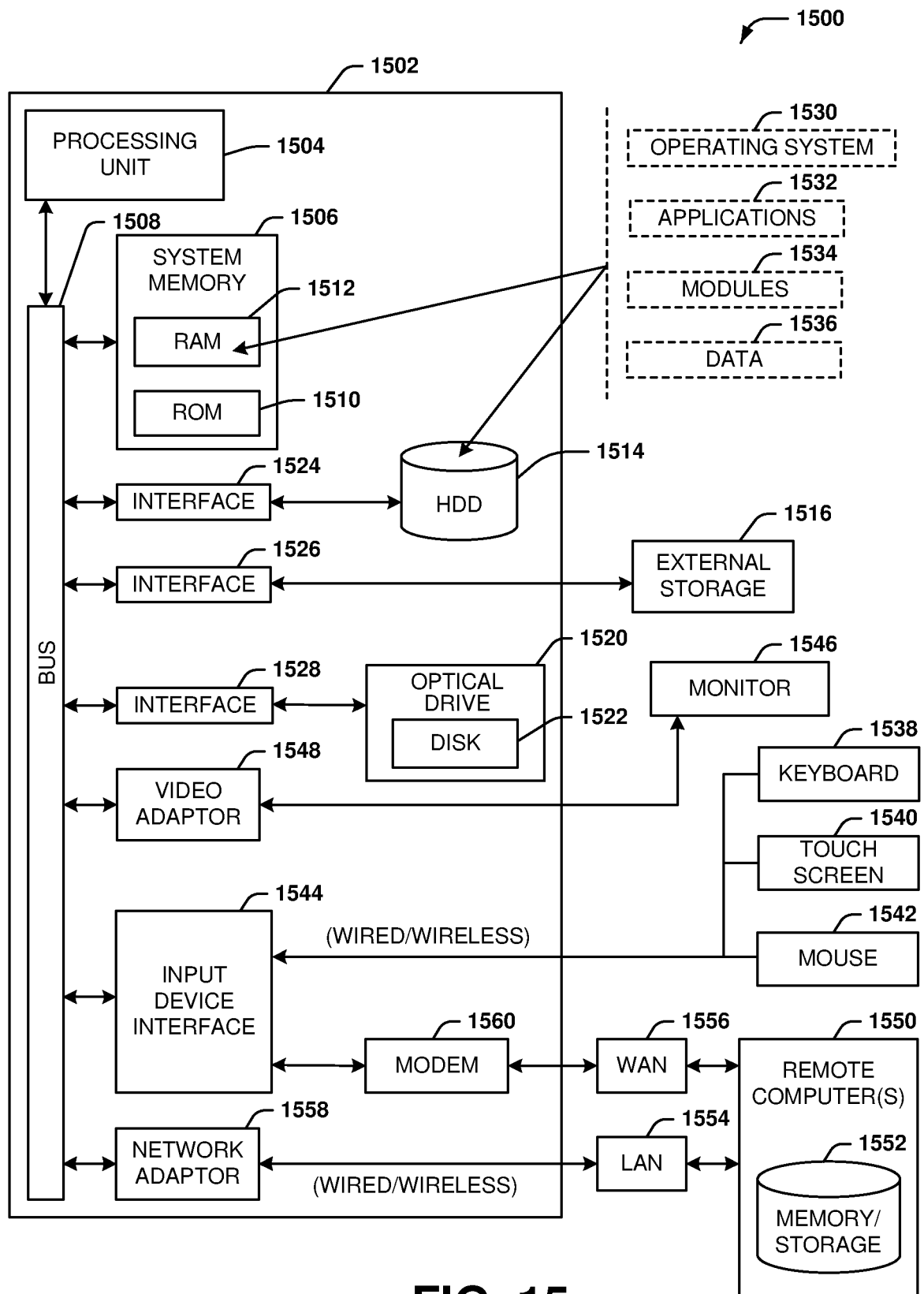
FIG. 15 depicts an example computing environment in which various embodiments described herein can function.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 and an optical disk drive 1520, (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514 and optical disk drive 1520 can be connected to the system bus 1508 by an HDD interface 1524 and an optical drive interface 1528, respectively. The HDD interface 1524 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an infrared (IR) remote control, a joystick, a game pad, a stylus pen, touch screen or the like. These and other input devices are often connected to the processing unit 1504 through an input device interface 1542 that can be coupled to the system bus 1508, but can be connected by other interfaces, such as a parallel port, an IEEE 1394 serial port, a game port, a USB port, an IR interface, a BLUETOOTH® interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless access point (AP) disposed thereon for communicating with the wireless adapter 1556.

When used in a WAN networking environment, the computer 1502 can include a modem 1558 or can be connected to a communications server on the WAN 1554 or has other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
   a transceiver;
   a processor; and
   a memory that stores executable instructions that, when executed by the processor, facilitate performance of operations, the operations comprising:
   in response to an observed signal strength at a user equipment, associated with the device, being determined to have fallen below a threshold, physically decoupling the device from a launch surface that was physically coupled to the device, resulting in facilitation of movement of the device from a first position associated with the user equipment to a second position different from the first position, wherein the user equipment is able to communicate via a communication network;
   in response to physically decoupling the device from the launch surface, determining a first communication frequency for communications between the device and the user equipment based on features determined to be present in an environment associated with the user equipment, the first communication frequency being different from a second communication frequency used by the communication network; and
   conveying signals transmitted via the communication network to the user equipment using the transceiver at the first communication frequency instead of at the second communication frequency.

2. The device of claim 1, wherein the signals transmitted by the communication network are first signals, and wherein the operations further comprise:
   receiving second signals transmitted by the user equipment via the transceiver at the first communication frequency; and
   conveying the second signals to the communication network via the transceiver at the second communication frequency instead of the first communication frequency.

3. The device of claim 1, further comprising:
   a rotor system,
   wherein the operations further comprise engaging the rotor system in response to physically decoupling the device from the launch surface and moving the device to the second position via the rotor system.

4. The device of claim 3, wherein physically decoupling the device from the launch surface comprises ejecting the device from the launch surface, and wherein engaging the rotor system comprises detecting acceleration of the device associated with ejecting the device from the launch surface and engaging the rotor system in response to detecting the acceleration of the device.

5. The device of claim 1, wherein the operations further comprise:
   obtaining signal quality measurements for signals received by the transceiver from the communication network at respective ones of a group of candidate positions; and
   defining a candidate position of the group of candidate positions having a signal quality measurement that is greater than the threshold as the second position.

6. The device of claim 1, wherein the user equipment is a first user equipment, and wherein the operations further comprise:
   receiving authentication data from a second user equipment via the transceiver;
   validating the authentication data; and
   enabling communication between the first user equipment and the second user equipment via the device independently of the communication network in response to the validating.

7. The device of claim 1, further comprising:
   a surface adhesive physically coupled to the device,
   wherein the operations further comprise, in response to physically decoupling the device from the launch surface, facilitating the movement of the device via adhesion of the surface adhesive to an environmental surface at the second position.

8. The device of claim 7, further comprising:
an activation switch,
wherein the operations further comprise initializing conveying the signals transmitted by the communication network to the user equipment in response to the activation switch being engaged.

9. The device of claim 1, further comprising:
a camera,
wherein the operations further comprise capturing images of an area associated with the second position via the camera while at the second position and transmitting the images to the user equipment via the transceiver.

10. A method, comprising:
physically coupling, by a mobile antenna device comprising a processor, to a user equipment;
in response to a signal strength observed at the user equipment from a communication network being lower than a threshold, physically decoupling, by the mobile antenna device, from the user equipment, resulting in facilitation of movement of the mobile antenna device from a first position associated with the user equipment to a second position;
in response to physically decoupling the mobile antenna device from the user equipment, determining, by the mobile antenna device, a first communication frequency for communication from the mobile antenna device to the user equipment based on features of an environment associated with the user equipment, wherein the first communication frequency is different from a second communication frequency used by the communication network; and
relaying, by the mobile antenna device, communications from the communication network to the user equipment at the first communication frequency instead of the second communication frequency.

11. The method of claim 10, wherein the communications from the communication network are first communications, and wherein the method further comprises:
receiving, by the mobile antenna device, second communications from the user equipment device at the first communication frequency; and
relaying, by the mobile antenna device, the second communications to the communication network at the second communication frequency instead of the first communication frequency.

12. The method of claim 10, further comprising:
in response to physically decoupling the mobile antenna device from the user equipment, engaging, by the mobile antenna device, a rotor system at the mobile antenna device; and
moving, by the mobile antenna device, to the second position via the rotor system.

13. The method of claim 12, wherein moving to the second position comprises:
measuring, by the mobile antenna device, signal qualities for signals received from the communication network at respective ones of a group of candidate positions; and
defining, by the mobile antenna device, a candidate position of the group of candidate positions having a signal quality that is greater than the threshold as the second position.

14. The method of claim 10, wherein the communications from the communication network are first communications, wherein the mobile antenna device is a first mobile antenna device, and wherein the method further comprises:
relaying, by the first mobile antenna device, second communications between the user equipment device and a second mobile antenna device.

15. The method of claim 10, wherein the user equipment device is a first user equipment device, and wherein the method further comprises:
receiving, by the mobile antenna device, authentication credentials from a second user equipment device;
validating, by the mobile antenna device, the authentication credentials; and
enabling, by the mobile antenna device, communication between the first user equipment device and the second user equipment device via the mobile antenna device independently of the communication network in response to the validating being successful.

16. A non-transitory machine-readable medium, comprising executable instructions that, when executed by a processor of a mobile antenna device, facilitate performance of operations, comprising:
in response to a signal strength, observed at a user device and received via a communication network, being lower than a threshold, causing the mobile antenna device to physically decouple from a launch surface associated with the user device;
in response to causing the mobile antenna device to physically decouple from the launch surface, causing the mobile antenna device to move from a first location associated with the user device to a second location that is distinct from the first location;
determining a first frequency for communication from the mobile antenna device to the user device while at the second location based on features of an environment associated with the user device, wherein the first frequency is different from a second frequency used by the communication network; and
relaying signals from the communication network to the user device at the first frequency instead of the second frequency while at the second location.

17. The non-transitory machine-readable medium of claim 16, wherein the operations further comprise:
causing the mobile antenna device to move to the second location by engaging a rotor system at the mobile antenna device and facilitating movement of the mobile antenna device to the second location via the rotor system.

18. The non-transitory machine-readable medium of claim 16, wherein the operations further comprise:
measuring signal qualities for signals received from the communication network at respective ones of a group of candidate second locations; and
defining a candidate second position of the group of candidate second locations having a signal quality that is greater than the threshold as the second location.

19. The non-transitory machine-readable medium of claim 16, wherein the signals from the communication network are first signals, wherein the mobile antenna device is a first mobile antenna device, and wherein the operations further comprise:
relaying second communications between the user device and a second mobile antenna device.

20. The non-transitory machine-readable medium of claim 16, wherein the user device is a first user device, and wherein the operations further comprise:
authenticating with a second user device that is different from the first user device; and
in response to the authenticating, enabling communication between the first user device and the second user device via the mobile antenna device independently of the communication network.

* * * * *